United States Patent [19]

Satou et al.

[11] Patent Number: 4,954,215

[45] Date of Patent: Sep. 4, 1990

[54] METHOD FOR MANUFACTURE STRESS DETECTOR

[75] Inventors: Hiroshi Satou; Yoshihiko Utsui; Kiyotugu Tuneyoshi; Takashi Taniguchi; Kousuke Haraga; Keitarou Tsukui, all of Amagasaki, Japan

[73] Assignee: Mitsubishi Denki Kabushiki Kaisha, Tokyo, Japan

[21] Appl. No.: 346,112

[22] PCT Filed: Jul. 20, 1988

[86] PCT No.: PCT/JP88/00727

§ 371 Date: May 5, 1989

§ 102(e) Date: May 5, 1989

[87] PCT Pub. No.: WO89/00770

PCT Pub. Date: Jan. 26, 1989

[30] Foreign Application Priority Data

Jul. 21, 1987 [JP] Japan ............................... 62-182712
Oct. 26, 1987 [JP] Japan ............................... 62-271164
Oct. 26, 1987 [JP] Japan ............................... 62-271165
Dec. 18, 1987 [JP] Japan ............................... 62-322008

[51] Int. Cl.$^5$ .................. B44C 1/22; B23K 9/00; C23F 1/02; C03C 15/00
[52] U.S. Cl. ................................. 156/630; 29/605; 156/634; 156/643; 156/656; 156/659.1; 219/121.69; 219/121.85
[58] Field of Search ............... 156/630, 634, 637, 643, 156/654, 655, 656, 659.1; 29/605; 219/121.67, 121.68, 121.69, 121.85

[56] References Cited

U.S. PATENT DOCUMENTS 4,566,936 1/1986 Bowlin ............................. 156/643 X
4,639,708 1/1987 Weatherly ....................... 29/605 X

FOREIGN PATENT DOCUMENTS 56-36470 8/1981 Japan .
0187289 11/1983 Japan .
0178627 8/1986 Japan .
0195323 8/1986 Japan .

Primary Examiner—William A. Powell
Attorney, Agent, or Firm—Sughrue, Mion, Zinn, Macpeak & Seas

[57] ABSTRACT

This invention relates to a method for manufacturing a highly reliable stress detector. Conventionally, a step of bonding and securing magnetic elements (4) to a driven shaft (1) receiving a stress was needed, so that a high technique was needed to secure the magnetic elements (4) uniformly at the entire surface and transversely symmetrically, disadvantageously increasing the process cost.

The present invention therefore has as its object the manufacture of a reliable stress detector by simplifying the process of securing the magnetic elements (4) and realizing a good attachment. According to this invention, a strip of magnetic thin sheet is secured around the driven shaft receiving a stress, and a selective coating removal treatment is applied to the magnetic thin sheet secured to the driven shaft to form magnetic elements parallelly arranged at a predetermined angle relative to the central axis of the driven shaft. Also, the present invention includes a technique using an epoxy-based bonding agent in the attachment and regulating its thickness. According to this invention, a highly reliable stress detector can be realized by a simple, low-cost process, and the stress detector of the present invention can be widely used in a wide field of industrial apparatus such as automobiles.

10 Claims, 4 Drawing Sheets

FIG. 1 PRIOR ART
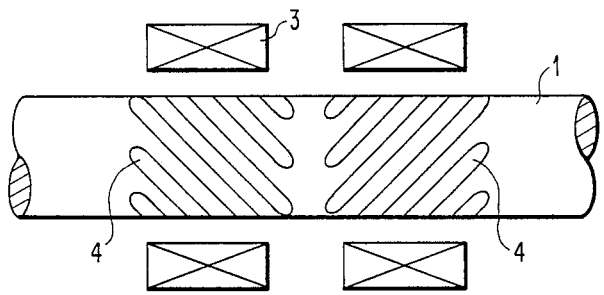
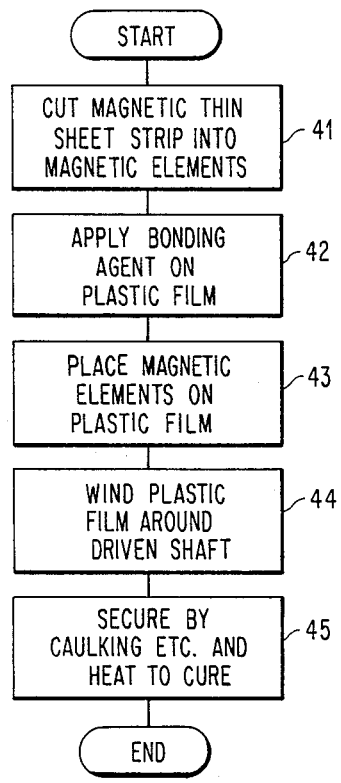
FIG. 2 PRIOR ART
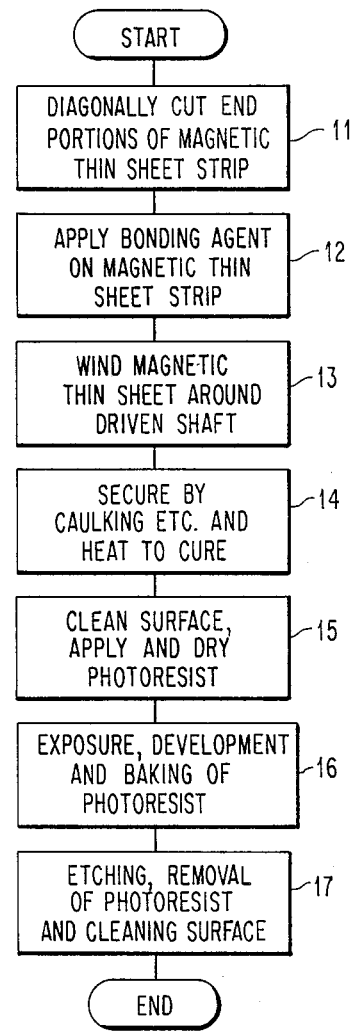
FIG. 3

METHOD FOR MANUFACTURE STRESS DETECTOR

TECHNICAL FIELD

This invention relates to a method for manufacturing a stress detector, which is used in manufacturing a torque detector or the like for the non-contact measuring of the axle torque on the driven shaft such as a rotary shaft widely used in the industrial equipments such as an automotive steering shaft, a propeller shaft, an axle as well as electric motors and compressors.

BACKGROUND ART

FIG. 1 is a schematic diagram showing a torque detector disclosed in Japanese Patent Laid-Open No. 61-178627 for example, in which figure, (1) is a driven shaft to which a torque is applied, (3) are coils for detecting the amount of change in magnetic permeability, (4) are magnetic elements of which magnetic permeability change in accordance with the amount of the internal strain generated by the torque applied to the driven shaft (1). A plurality of magnetic elements in the form of strip pieces cut from a thin sheet of magnetic material are arranged in symmetry around the driven shaft (1) at an angle of ±45° for example.

The operation will now be described When a Lorque is applied from the exterior to the driven shaft (1), a main stress having a main axis along the longitudinal direction of a group of the rectangular magnetic elements is generated. When it is assumed that this stress is a tensile force in the magnetic element group on the left side of the driven shaft (1) as viewed in FIG. 1, then the stress on the right side element group is a compression force. In general, when a stress is applied to a magnetic material of which constant of magneto-restriction is not zero, its magnetic property varies and accordingly the magnetic permeability changes as well known. This phenomenon is utilized in a magnetoristriction transducer for converting mechanical energy into electrical energy, and corresponds to Villari effect according to which the magnetic permeability of a magnetic material varies in accordance with the amount of deforming of the material. Also, when the magnetoristriction constant, which is an amount quantitably indicating the amount of magnetoristriction, is positive, the magnetic permeability increases when a tensile force is applied, and the magnetic permeability decreases when a compressive force is applied. It is also known that a quite opposite result is obtained when the constant of magnetoristriction is negative. Therefore, since the magnetic permeability of the magnetic elements (4) changes as they deform in accordance with the amount of the externally applied torque, the amount of the torque applied to the driven shaft (1) can be determined by detecting the change in magnetic permeability as the change in magnetic impedance by the sensor coils (3) wound around the driven shaft (1).

As a method for securely attaching the magnetic elements (4) on the driven shaft (1) of the torque detector of the above-described construction, a method in which the magnetic elements are formed from a thin sheet of a magnetic material and the magnetic elements (4) are bonded one by one to the driven shaft (1) at a predetermined angle thereto, or a method in which the magnetic elements (4) are bonded to a nonmagnetic film by a bonding agent or the like and then this film is wound around the driven shaft (1) and secured thereto by an epoxy thermo-setting bonding agent or the like.

FIG. 2 is a flow chart showing where the magnetic elements are bonded by a bonding agent onto a conventional non magnetic film. As seen from the figure, a strip of thin magnetic sheet material is cut into a plurality of magnetic elements (Step 41). Then, a bonding agent is applied on the plastic film (Step 42). The magnetic elements are placed on the bonding agent applied to the plastic film (Step 43), and the plastic film is wound around the driven shaft (1) (Step 44). The plastic film is secured by caulking at its periphery and thermally set to firmly attach the magnetic elements (4) around the driven shaft (1) (Step 45).

According to the conventional manufacturing method, a careful attention must be paid to arrange the magnetic elements at a predetermined angle with respect to the driven shaft (1). Particularly, when the plastic film is bonded by a thermo-setting bonding agent after the magnetic elements are bonded to the plastic film, it is necessary that the plastic film be of a heat-resistive material such as polyimide, Teflon, polyester/-polyimide and that the bonded portion be firmly secured, allowing no movement. Particularly, when an amorphous magnetic material is used as the magnetic sheet material, a large external force is necessary to firmly and intimately secure them around the driven shaft (1) since the amorphous magnetic material is very hard and elastic. Also, the efficiency of the transmission of the stress due to the torque between the driven shaft (1) and the magnetic elements (4), that is, the magnitude of the stress propagation in the radial direction within the bonding agent layer depends upon the thickness of the bonding agent layer, so that it is desirable that the thickness of the bonding agent layer is thin and uniform in order to increase the sensitivity to the torque. In particular, when the magnetic elements are arranged in pairs in differential-type as shown in FIG. 1, the imbalance of the thickness of the bonding agent layer on the left and right directly affects the balance of the output, so that it is necessary to pay attention to ensure that the external force applied for securing as well as the amount of the applied bonding agent is equal between both left and right sides and is uniform throughout.

Particularly, when an imbalance appears in the thickness of the layer of the bonding agent on the left and right sides, this becomes an offset in the static characteristics of the sensor, which offset is difficult to be temperature-compensated because the offset amount increases and decreases according to temperature and is not an amount that can be estimated at the time of manufacture.

Since the conventional method for manufacturing a stress detector is as above described, the process conditions at the time of bonding must be sufficiently suppressed and the attaching conditions for the magnetic elements (4) must be made uniform throughout and symmetry in the left-and-right wise, so that a very reliable, delicate and complex technique is needed. Even with such technique, it is difficult to obtain a quality stress detector, posing problems of time-consuming adjustment, high process costs, etc.

This invention has been made in order to solve the above problems and has as its object the provision of a method for manufacturing a highly reliable stress detector in which the process for securing the magnetic elements (4) can be simplified, and the securing conditions can be uniform throughout and symmetric in transverse direction, and the dispersion of the detector quality can be decreased.

SUMMARY OF THE INVENTION

The method for manufacturing a stress detector of the present invention comprises the steps of securing a strip of a magnetic thin sheet around a driven shaft, and applying selective coating eliminating treatment to the magnetic thin sheet secured to the driven shaft to obtain magnetic elements arranged at a predetermined angle with respect to the central axis of the driven shaft.

In the step of securing the magnetic thin sheet to the driven shaft, when a bonding agent is to be applied to the magnetic thin sheet, since the area of the magnetic thin sheet is considerably large as compared to the conventional magnetic element, it is easy to apply a bonding agent to the magnetic thin sheet, so that the bonding agent can be relatively easily uniformly applied. In the step of securing the strip of the magnetic thin sheet, the axial dimensional accuracy of the driven shaft (1) is not required, and when the selective removal treatment is applied after securing, not only the accuracy of the axial dimension, but also all the positional accuracy in the circumferential direction, width of the magnetic elements, gap between them, etc. can be obtained within the tolerance of the positional error of the selective removal treatment. Further, when the magnetic thin sheet is to be secured by externally utilizing a caulking tool or the like to increase the intimate contact relationship, uniform application of a pressure over the entire surface throughout is easy. In particular, when the arrangement is of the differential type in which the magnetic elements are in pairs, the left and the right elements can be formed at the same time by a single process, enabling to easily obtain the arrangement which is uniform over the entire surface and symmetry in the left-and-right wise direction.

Also, when end portions of the pre-formed strip of the magnetic thin sheet are diagonally cut to have a predetermined angle with respect to the drive shaft, no discontinuity is generated in a plurality of magnetic elements formed by the selective removal treatment.

BRIEF DESCRIPTION OF THE DRAWINGS

FIG. 1 is a schematic diagram showing a general torque detector as one example of a stress detector; FIG. 2 is a flow chart showing the conventional method for manufacturing a stress detector; FIG. 3 is a flow chart showing one embodiment of the present invention.

BEST MODES FOR CARRYING OUT THE INVENTION

Figure 4A:
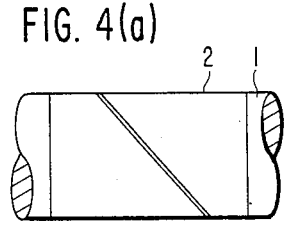
FIGS. 4(a) and 4(b) are perspective views showing the stress detector of one embodiment of the present invention.
Figure 4B:
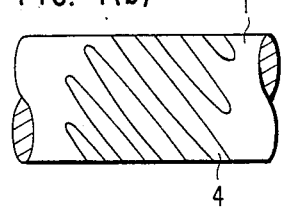

One embodiment of the present invention will now be described in conjunction with the drawings. Although the torque detector of FIG. 1 is shown as being of the differential type in which the magnetic element group is parallel arranged in parallel at an angle of 45°, the manufacture of only one of them will be described. FIG. 3 is a flow chart showing the steps of the method for manufacturing a stress detector according to one embodiment of this invention, and FIG. 4 is a perspective view showing the stress detector being manufactured. In Step 11, a strip of magnetic thin sheet (2) made of an amorphous magnetic material having a large magnetoristrictive effect such as Fe, Ni and Co based metals and the end portions are diagonally cut so that they are substantially at equal angles to the angle of the magnetic elements (4) relative to the axis when the thin sheet is secured to the driven shaft (1). Then, in Step (12), an epoxy resin based thermo-setting bonding agent for example is applied to the entire surface of the magnetic thin sheet (2). This is closely wound around the driven shaft (1) as shown in FIG. 4(a) (Step 13) and the periphery is secured by applying thereto a differential pressure more than about 1 kgf cm$^2$ by such as a caulking tool. Then, this is placed into an oven to heat and cure at about 120° C. to secure around the driven shaft (1) (Step 14). After heating and curing, a selective coating removal treatment generally known as photoetching treatment is applied, whereby the parallel magnetic elements (4) at an angle of 45° for example with respect to the central axis of the driven shaft (1) can be obtained as shown in FIG. 4(b). The basic process of the photoetching treatment includes, as shown in FIG. 3, cleaning of the surface, applying and drying of photo-resist at Step 15, exposing, developing and baking of the photo-resist in Step 16, and applying selective coating removal treatment by etching, removing, surface cleaning of the photo-resist as shown in Step 17.

The strip of the magnetic thin sheet (2) in this example has a length corresponding to the circumference of the driven shaft (1) that is shorter than the circumference of the driven shaft (1) and has an axial dimension that is longer than the axial length of the magnetic elements (4) to be formed, so that the magnetic thin sheet can be easily wound on the driven shaft (1) in Step 13. Further, the circumferential end portions are formed to be at an angle substantially equal to the inclined angle of the magnetic elements (4) with respect to the axis when the thin sheet is attached to the driven shaft (1). Therefore, no magnetic element (4) has joint. If, for example, the end portions are not diagonally cut, the magnetic element (4) at the end of the turns inevitably has joint. When a laser beam source is used to make a slanted edge at a predetermined angle with respect to the driven shaft (1), the edge can be sharply cut, but other cutting means can be used. Also since the magnetic thin sheet (2) is made of an amorphous magnetic material, rough surface of this material can be used to secure it to the driven shaft (1) in Step (13), resulting in an easy attachment owing to the surface conditions. Also, when the strip of the amorphous magnetic material is to be cut at its end portions in Step (11) the amorphous magnetic material may be irradiated by the laser beam source at the rough surface, the dimensional accuracy of the cut edge can be made higher because the rough surface is superior in light absorbing characteristic.

In this embodiment, the bonding agent is applied over substantially entire surface of the strip of the magnetic thin sheet (2) and the surface area of the magnetic thin sheet (2) is relatively large as compared to that of the conventional magnetic elements (4), so that the uniform and symmetrical application of the bonding agent can easilY be made. Also, as to the positional accuracy of the plurality of the magnetic elements (4) thus obtained, a high accuracy is not required when the magnetic thin sheet (2) is to be secured on the driven shaft (1), and an accuracy within a set tolerance associated with the selective coating removal treatment such as mask alignment.

Figure 6A:
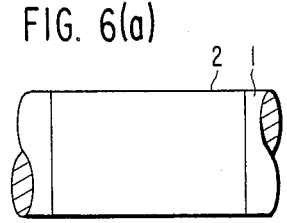
FIGS. 6(a) and 6(b) are perspective views of the stress detectors according to other embodiments of the present invention.
Figure 5:
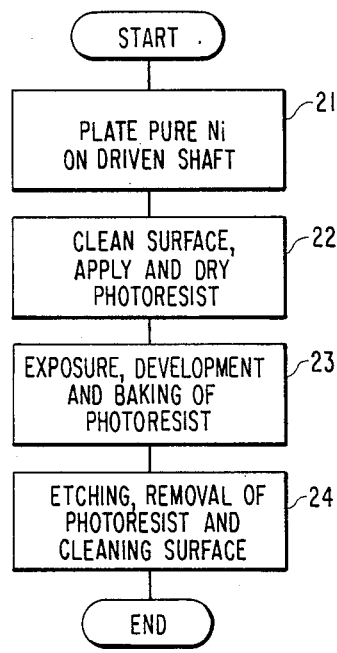
FIG. 5 is a flow chart showing another embodiment of the present invention.

Another embodiment of the present invention will now be described in conjunction with figures. FIG. 5 is a flow chart showing the steps of the method for manufacturing the stress detector according to the embodiment, and FIG. 6 is a perspective view showing the stress detector being manufactured. First, as shown in Step (21), a magnetorestrictive material such as pure Ni or Permalloy or the like is plated on the surface of the driven shaft (1), and the magnetic thin sheet (2) is secured around the driven shaft (1) as shown in FIG. 6(a).

Figure 6B:
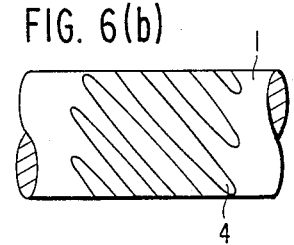

Thereafter, similarly to the above embodiment, the plurality of parallelly arranged magnetic elements (4) defining a predetermined angle relative to the driven shaft (1) by the so-called photoetching treatment step in Steps (22), (23) and (24) (FIG. 6(b)).

In this embodiment, homogenious coating can be easily obtained by making sure that conditions in the plating tank such as the electric field distribution and temperature distribution are uniform by agitating or rotating. As to the positional accuracy of the plurality of the magnetic elements (4), advantageous results similar to those obtained in the above embodiment can be obtained.

Figure 7:
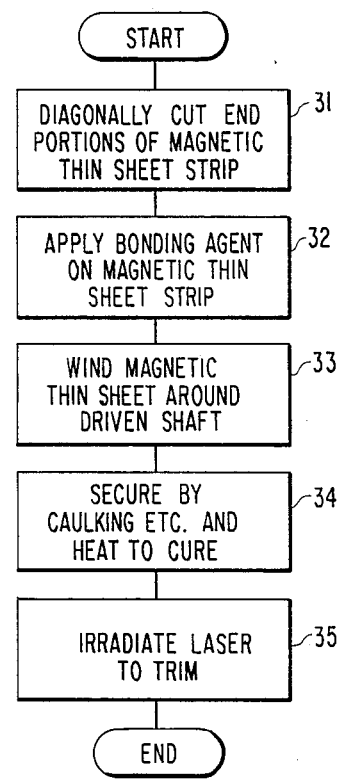
FIG. 7 is a flow chart showing another embodiment of the present invention.

A still another embodiment of the present invention will now be described in conjunction with the drawings. FIG. 7 is a flow chart showing the steps of the method for manufacturing the stress detector of this embodiment in sequence. A bonding agent is applied (Step 32) to the strip of the magnetic thin sheet (2) of which end portions are diagonally cut in Step (31). Then, this is wound to the driven shaft (1) (Step 33) and heated ant cured at about 120° C. to securely attached around the driven shaft (1) (Step After the thermosetting, unnecessary portions are selectively removed through the use of a laser source such as YAG, $CO_2$, etc. of more than 10 W, thereby obtaining a plurality of parallelly arranged magnetic elements (4) (Step 35)).

In this case, it is necessary to make sure that the laser source used be of high power to ensure that the trimming completes before the entire magnetic thin sheet (2) is heated and that the temperature of the bonded portion become unnecessarily high.

Although the laser trimming is employed in this embodiment, it is not limited to the laser trimming, but other physical method using plasma etching, ion etching, electron beam irradiation or the like can be used to obtain similar advantageous results.

While, in the above embodiment, the description has been made as to the method for manufacturing the magnetic elements (4) parallelly arranged in an inclined relationship in one direction with respect to the central axis of the driven shaft (1), it is not limited to this but is applicable to the differential type detector as shown in FIG. 1, for example. In this case, the circumferential end portions of the strip of the magnetic thin sheet (2) must be cut in a V-shape.

Also, while, in the above embodiment, the manufacturing method of the torque detector has been explained, the external force is not limited to torque, and it can be applied generally to detectors utilizing the change in magnetic permeability due to the internal stress in the magnetic elements (4) induced by an external force, providing similar advantageous results in load meters, position detectors, pressure gauges, etc.

As has been described, according to the present invention, a method for manufacturing a stress detector can be provided, which comprises the steps of securing a strip of a magnetic thin sheet around a driven shaft, and applying selective coating eliminating treatment to the magnetic thin sheet secured to the driven shaft to obtain magnetic elements arranged at a predetermined angle with respect to the central axis of the driven shaft, whereby a highly reliable stress detector in which the manufacturing process can be simplified with high accuracy and small dispersion.

The description will now be made as to the first to the third embodiments in connection with the method for controlling the thickness of the bonding agent layer in the embodiment shown in FIG. 3.

The first embodiment will now be described in conjunction with the figure. The structure of the torque detector according to this embodiment is similar to that shown in FIG. 1, but the magnetic thin sheet (2) is an amorphous magnetorestrictive material (for example, Product name 2826 MB of Allied Chemical Co.), and the bonding agent for bonding the magnetic thin sheet (2) to the driven shaft (1) is a thermosetting epoxy-based film bonding agent having a thickness of less than 100 $\mu$m (for example, Product name AF147, Sumitomo-3M Co.). The operation as the torque detector is similar to that of the conventional design.

Figure 8:
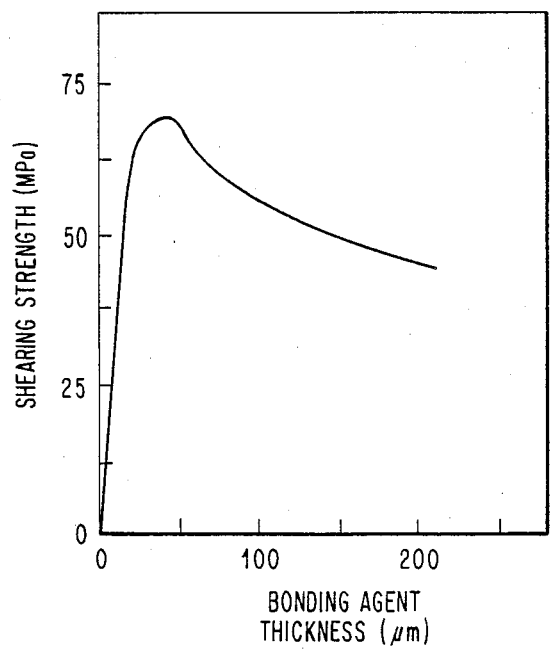
FIG. 8 is a characteristic diagram showing the relationship between the thickness of the bonding agent and the shear strength.

FIG. 8 illustrates the relationship between the thickness [$\mu$m] of the bonding agent and its shearing strength [MPa], from which it is seen that the shearing strength is maximum when the thickness of the bonding agent is in the order of 50 $\mu$m, a desirable shearing strength and therefore a desirable bonding strength can be obtained when the thickness is within a range of from 20 $\mu$m to 100 $\mu$m.

Further, with the Young's modulus $E_1$, the linear expansion coefficient $\beta_1$ and the thickness $t_1$ of the driven shaft (1), the rigidity factor Gc and the thickness h of the bonding agent, and the each length or the schevron length L, Young's modulus $E_2$, the linear expansion coefficient $\beta_2$ and the thickness $t_2$ of the magnetic thin sheet (2), then, since the Young's modulus $E_1$, $E_2$ of the driven shaft (1) and the magnetic thin sheet (2) are larger than the Young's module of the bonding agent by the order of two, it is assumed that the compression/tension stress parallel to the surface of the driven shaft (1) is absorbed by the shear deformation of the bonding agent, that only tensile or compressive deformation in the longitudinal direction is generated in the driven shaft (1) and the magnetic thin sheet (2) and that no bending deformation is generated. Also, when it is assumed that a deformation $u_1$ in the x direction (longitudinal direction) of the driven shaft (1) and a deformation $u_2$ of the magnetic thin sheet (2), a shear deformation $\tau$ in the bonding agent is in the following relationship when the bonding agent has the rigidity factor Gc and the shearing stress:

$$\gamma = \frac{\tau}{Gc} = \frac{u_2 - u_1}{h}$$

Figure 9:
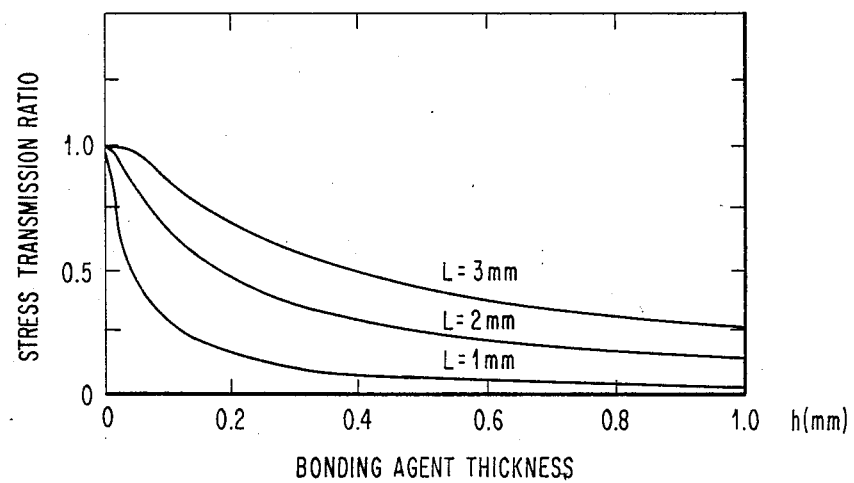
FIG. 9 is a characteristic diagram showing the relationship between the thickness of the bonding agent and the stress propagation ratio.

Also, since $t_2$ is of the order of 25 μm and $t_1$ is several thousands μm, an assumption of $E_1 t_1 > E_2 t_2$ is held so that the ratio of stress transmitted from the driven shaft (1) to the magnetic thin sheet (2) through the bonding agent or the stress transmission ratio $\sigma_{2x}/\sigma_{2o}$ is:

$$\frac{\sigma_{2x}}{\sigma_{2o}} = 1 - \frac{\cos h(\sqrt{A}\,x\,)}{\cos h(\sqrt{A/2}\,L\,)}$$

where, $A = Gc/hE_2 t_2$. FIG. 9 shows a relationship between the thickness h of the bonding agent and the stress transmission ratio against the parameter of the length L of the magnetic thin sheet (2), the stress transmission ratio being changed as the change in thickness of the bonding agent. In this embodiment, the thickness of the bonding agent is equal to or more than 20 μm and equal to or less than 100 μm, so that the stress transmission ratio is large, providing a stress transmission ratio equal to or more than 70% even when the schevron length of the magnetic thin film (2) is 2 mm for example, increasing the torque detecting sensitivity.

Also, since the efficiency is increased by the improvement in the torque detecting sensitivity, the applied current to the detection coil (3) can be made small-sized, decreasing the heat generation in the detection coil (3) and the transistors, capacitors, resistors and the like in the detection circuit (not shown), so that the power-on-drift and aging are decreased and the reliability is increased.

As has been described, according to this embodiment, the elongated magnetic elements (4) are bonded to the outer circumference of the driven shaft by the epoxy-based bonding agent having a thickness equal to or more than 20 μm and equal to or less than 100 μm and the thickness of the bonding agent is small, so that the stress transmission from the driven shaft to the magnetic elements (4) is increased to improve the torque detection sensitivity. Also, since the bonding agent is thin, the bonding strength is increased, resulting in an increased reliability. Further, since the current to the detection coil can be made small because the efficiency is increased due to the increase in the detection sensitivity, the heat generation is decreased and the operating life can be increased.

Figure 10:
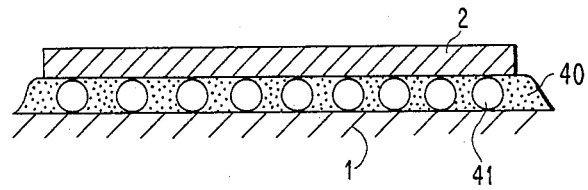
FIGS. 10, 11(a) and 11(b) are schematic diagrams illustrating another embodiment of the present invention.

The second embodiment will now be described in conjunction with the drawings. FIG. 10 is a sectional view showing the main portion of the strain detector according to the second embodiment, wherein 40 designates a bonding agent in which a large number of same-diameter non-magnetic balls 41 are mixed. The non-magnetic balls 41 are alumina balls of a diameter equal to or less than 100 μm, and these balls 41 are mixed with the bonding agent 40 at a proportion of 5 weight %. Mixing is carried out by agitating in vacuum to eliminate any bubbles. As for the bonding agent 40 a thermosetting single-liquid epoxy-based bonding agent is used. Also, as for the magnetic thin sheet (2), an amorphous magnetic material having Young's module of 16500 kgf/mm² is used. The magnetic thin sheet (2) is bonded and secured to the outer circumference of the driven shaft 1 by the bonding agent 40 in which the nonmagnetic balls 41 are mixed.

In the above construction, the reason for the nonmagnetic balls 41 being used is that if magnetic balls are used they serve as passages for the magnetic flux generated from the detection coil 3, decreasing the number of intersecting magnetic fluxes of the magnetic thin sheet (2) and decreasing the sensitivity. Also, the reason for the amorphous magnetic material is used is that the magnetoristriction constant is large and that the stress concentration is difficult to occur because it is hard and not easily deformed. Also the non-magnetic balls 41 are mixed into the bonding agent 40 by agitating in vacuum because bubbles may be formed and become too hard to sufficiently agitate if mixing is carried out in air.

In the above-described strain detector, the thickness of the bonding agent 40 becomes substantially equal to the diameter of the non-magnetic balls 41 to become uniform and the error is within ± several %. Therefore, as shown in FIG. 1, the stress transmitted from the driven shaft 1 to the magnetic elements (4) is uniform, providing a linear stable output characteristic. Also, no dispersion is observed in temperature characteristic and it is cancelled out when the magnetic elements (4) are used in differential manner. Further, since the non-magnetic balls 41 are mixed into the bonding agent 40, the entire hardness of the bonding agent layer is increased, making the stress transmission ratio higher to increase the sensitivity and since the coefficient of linear expansion $\beta$ of the bonding agent layer become small, decreasing the difference in the coefficient of linear expansion $\beta$ relative to the driven shaft 1 and the magnetic elements (4), whereby the thermal stress decreases. Also, since the efficiency is improved due to increase in the sensitivity, the applied current to the detection coil 3 can be small, the heat generation in the circuit portion is decreased and the aging is slow.

As for the non-magnetic balls 41, glass beads, acrylic/polyethylene beads or the like may be used.

As has been described according to this embodiment, the magnetic thin sheet (2) is secured to the driven shaft by the bonding agent including the non-magnetic balls, the thickness of the bonding agent is determined by the diameter of the non-magnetic balls and is uniform, and the stress transmitted from the driven shaft 1 to the magnetic elements (4) through the bonding agent is uniform. Therefore, the output characteristic and temperature characteristic become good and the sensitivity is improved. Further, the bonding agent becomes to have a high sensitivity and a small coefficient of expansion, and also have a high stress transmission ratio and small residual thermal stress, increasing the sensitivity.

The third embodiment will now be described.

Figure 11A:
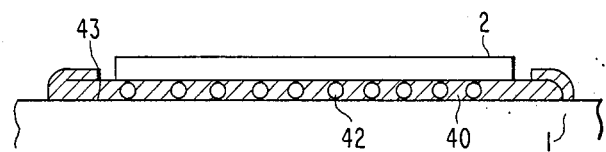
Figure 11B:
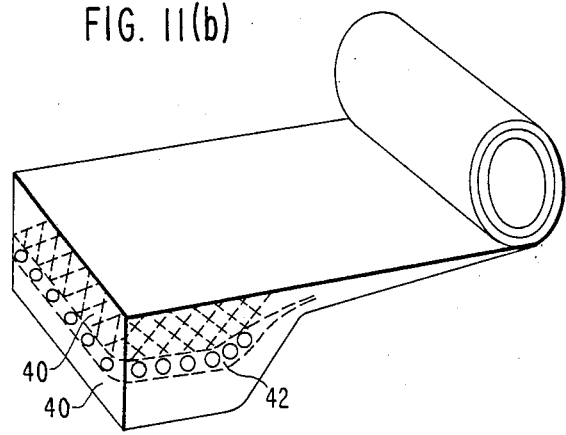

The third embodiment will be described in conjunction with the drawing. In this embodiment, the magnetic thin sheet 2 is bonded to the driven shaft 1 through the film-shaped bonding agent 43 as shown in FIG. 11(a). The film-shaped bonding agent 43 is an epoxy resin 40 impregnated into a non-magnetic net-shaped member 42 as shown in FIG. 11(b). Therefore, the magnetic thin sheet (2) is wound around the driven shaft 1 with the film shaped bonding agent 43 applied on the magnetic thin sheet (2) or the driven shaft 1, so that these two are bonded together through the film shaped bonding agent 43. Thereafter, the magnetic thin sheet (2) is pressed to the driven shaft 1 by the auto-crape process or pressurize process similar to the conventional method, and the film-shaped bonding agent 43 is heated and cured under this condition. Finally, the magnetic thin sheet (2) is subjected to the selective removal treatment by etching, thereby forming the schevron-shaped magnetic layers.

In this embodiment, since the bonding agent 43 is pre-formed in the shape of a film, it is not necessary to apply by painting and only necessary to attach to the magnetic thin sheet (2) and the driven shaft 1. Therefore, no uneven application and no bubbles are not involved, increasing the bonding strength and sensitivity due to the increased bonding area. Also, since the net-shaped member serves as a spacer, the thickness of the bonding agent 43 can be uniform (less than ±5%), and the output characteristic as well as the temperature characteristic is uniform.

When an epoxy resin or the like is applied to both of the driven shaft 1 and the magnetic thin sheet 2 before the bonding agent 43 is attached (plasma treatment), the bonding can be smoothly carried out. Also, the net-shaped member 42 is made non-magnetic in order to prevent that the magnetic flux generated by the current flowing through the detection coil 3 flows through the bonding agent 43 and that the magnetic flux flowing through the magnetic thin sheet 2 is decreased and the sensitivity is lowered.

As has been described according to the present invention, the bonding agent needs not to be applied by painting to the magnetic layer, so that no uneven application of the bonding agent and no bubble is involved and the bonding area is large, whereby the bonding strength is high and the reliability is high. Also, since the transmission of the stress from the driven shaft to the magnetic layer is efficient, the detection sensitivity is improved. Also, since the net-shaped member of the bonding agent serves as a spacer, the thickness of the bonding agent is uniform, improving the temperature characteristic of the residual thermal stress or the like and the output characteristic linearity.

We claim:

1. A method for manufacturing a stress detector comprising the steps of securing a strip of magnetic thin sheet around the driven shaft receiving a stress, and applying a selective coating removal treatment to said magnetic thin sheet secured to said driven shaft to form magnetic elements parallelly arranged at a predetermined angle relative to the central axis of said driven shaft.

2. A method for manufacturing a stress detector as claimed in claim 1, wherein said selective coating removal treatment is photo-etching treatment.

3. A method for manufacturing a stress detector as claimed in claim 1, wherein said selective coating removal treatment is one of plasma-etching, ion-etching, laser trimming and electron beam irradiation.

4. A method for manufacturing a stress detector as claimed in one of claims 1 to 3, said strip of magnetic thin sheet is formed by selecting the length corresponding to the circumference of said driven shaft to be shorter than the circumferential length of said driven shaft, and the axial length to be longer than the axial length of said magnetic elements to be formed, and forming the circumferential end portions at an angle substantially equal to the angle of inclination of said magnetic elements when it is secured to said driven shaft.

5. A method for manufacturing a stress detector as claimed in claim 1, said circumferential end portions of said magnetic thin sheet is cut by a laser source at a predetermined inclined angle relative to said driven shaft.

6. A method for manufacturing a stress detector as claimed in one of claims 1, 2, 3 or 5, wherein said magnetic thin sheet is an amorphous magnetic material, and said amorphous magnetic material is secured at its surface having recesses and projections to said driven shaft surface.

7. A method for manufacturing a stress detector as claimed in claim 5, wherein said magnetic thin sheet is an amorphous magnetic material, and said amorphous magnetic material is cut by irradiating a laser beam from a surface having recesses and projections.

8. A method for manufacturing a stress detector as claimed in claim 1, wherein said securing step includes using an epoxy-based bonding agent equal to and more than 20 μm and equal to and less than 100 μm.

9. A method for manufacturing a stress detector as claimed in claim 8, wherein said epoxy-based bonding agent has mixed therein a large number of same-diameter non magnetic balls.

10. A method for manufacturing a stress detector as claimed in claim 8, wherein said epoxy-based bonding agent is a film-shaped bonding agent in which a resin is impregnated into a net-shaped member.

* * * * *